United States Patent
Miller

(10) Patent No.: US 10,114,188 B2
(45) Date of Patent: *Oct. 30, 2018

(54) PANEL-MOUNTABLE FIBER OPTIC CABLE FEEDTHROUGH

(71) Applicant: Gary Evan Miller, Holly Springs, NC (US)

(72) Inventor: Gary Evan Miller, Holly Springs, NC (US)

(73) Assignee: M2 OPTICS, INC., Holly Springs, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/582,634

(22) Filed: Apr. 29, 2017

(65) Prior Publication Data
US 2017/0269319 A1    Sep. 21, 2017

Related U.S. Application Data

(63) Continuation-in-part of application No. 14/929,703, filed on Nov. 2, 2015, now Pat. No. 9,696,512.

(51) Int. Cl.
   *G02B 6/44* (2006.01)

(52) U.S. Cl.
   CPC ......... *G02B 6/4459* (2013.01); *G02B 6/4477* (2013.01)

(58) Field of Classification Search
   None
   See application file for complete search history.

(56) References Cited

U.S. PATENT DOCUMENTS

| | | | | |
|---|---|---|---|---|
| 2,122,988 A * | 7/1938 | Nelson | ..................... | H05G 1/02 248/51 |
| 3,186,051 A * | 6/1965 | Waddell | .................. | F16L 3/222 174/135 |
| 3,227,406 A * | 1/1966 | Shelton | ................. | F16L 3/1091 248/74.4 |
| 3,582,029 A * | 6/1971 | Moesta | ................... | F16L 3/222 248/300 |
| 3,906,592 A * | 9/1975 | Sakasegawa | ......... | F16L 3/1233 24/487 |
| 4,321,726 A * | 3/1982 | Rogers, Jr. | ................ | F16L 5/00 16/2.1 |
| 4,470,622 A * | 9/1984 | Pate | ....................... | F16L 3/1236 285/419 |
| 4,854,665 A * | 8/1989 | Gagnon | ............... | G02B 6/4459 285/903 |

(Continued)

*Primary Examiner* — Rhonda S Peace
(74) *Attorney, Agent, or Firm* — Douglas A. Pinnow

(57) ABSTRACT

A novel panel-mountable fiber optic cable feedthrough is described that has two main body parts that can be brought together around single or multiple fiber optic cables and secured in place to prevent slippage of the cable(s). Use of two such main body parts that split along a plane that passes through the axis of the fiber optic cable(s) allows joining the two main parts at any position along the cable(s) without the need to thread the cable(s) through one or more pre-formed cylindrical cavities in the body of the feedthrough. The main parts for this fiber optic feedthrough can be made by plastic injection molding suitably shaped to relieve bending strain in the glass optical fiber(s) within the cable(s). The foot-print for mounting such a feedthrough can be made compatible with that of a number of popular fiber optic connector mounts, including the SC-connector.

4 Claims, 7 Drawing Sheets

(56) References Cited

U.S. PATENT DOCUMENTS

| | | | | |
|---|---|---|---|---|
| 5,014,941 A * | 5/1991 | Sherman | G02B 6/4439 | 24/135 K |
| 5,261,633 A * | 11/1993 | Mastro | F16L 3/18 | 248/68.1 |
| 5,435,507 A * | 7/1995 | Murphy | F16L 3/10 | 174/40 R |
| 5,742,982 A * | 4/1998 | Dodd | F16G 11/00 | 24/16 R |
| 5,794,897 A * | 8/1998 | Jobin | H02G 7/053 | 24/459 |
| 5,887,487 A * | 3/1999 | Bravo | F16C 1/105 | 248/56 |
| 5,992,802 A * | 11/1999 | Campbell | H02G 3/30 | 248/68.1 |
| 5,999,683 A * | 12/1999 | Gustafsson | G02B 6/4459 | 385/134 |
| 6,056,245 A * | 5/2000 | White | H02G 3/30 | 174/135 |
| 6,079,673 A * | 6/2000 | Cox | F16L 3/1041 | 174/40 R |
| 6,135,398 A * | 10/2000 | Quesnel | G02B 6/4471 | 248/74.1 |
| 6,422,900 B1 * | 7/2002 | Hogan | H01R 9/0524 | 174/73.1 |
| 6,561,466 B1 * | 5/2003 | Myers | F16L 3/221 | 248/68.1 |
| 6,595,472 B1 * | 7/2003 | Pisczak | G02B 6/483 | 248/74.1 |
| 6,627,817 B1 * | 9/2003 | Kortenbach | H02G 3/083 | 174/541 |
| 6,666,415 B2 * | 12/2003 | Hansen | F16B 2/06 | 248/74.1 |
| 6,739,598 B1 * | 5/2004 | Saarem | F16L 7/02 | 277/602 |
| 6,892,990 B2 * | 5/2005 | Pisczak | H02G 7/053 | 248/62 |
| 7,534,965 B1 * | 5/2009 | Thompson | H02G 3/22 | 16/2.1 |
| 7,770,848 B2 * | 8/2010 | Johnson | F16L 3/1207 | 248/65 |
| 7,938,371 B2 * | 5/2011 | Oga | F16L 3/1025 | 248/55 |
| 8,033,408 B2 * | 10/2011 | Makela | H02G 3/0658 | 174/152 G |
| 8,074,945 B2 * | 12/2011 | Schoenau | F16L 5/14 | 248/316.6 |
| 8,267,357 B2 * | 9/2012 | Kataoka | H02G 3/088 | 174/135 |
| 8,275,230 B2 * | 9/2012 | Womack | G02B 6/4471 | 385/137 |
| 8,295,670 B2 * | 10/2012 | Berglund | G02B 6/4466 | 385/134 |
| 8,494,335 B2 * | 7/2013 | Khadar | G02B 6/4471 | 385/137 |
| 8,500,073 B2 * | 8/2013 | Quesnel | H02G 7/053 | 24/285 |
| 8,622,092 B1 * | 1/2014 | Condon | F16L 3/24 | 138/106 |
| 8,851,428 B2 * | 10/2014 | Moon | H02G 3/083 | 248/56 |
| 8,904,606 B2 * | 12/2014 | Aldrich | F16G 11/048 | 24/135 R |
| 8,985,533 B2 * | 3/2015 | Edmond | F16L 3/227 | 248/68.1 |
| 9,220,932 B2 * | 12/2015 | Zernach | A62C 2/065 | |
| 9,423,057 B2 * | 8/2016 | Vasinis | F01D 25/04 | |
| 9,696,512 B2 * | 7/2017 | Miller | G02B 6/4459 | |
| 2006/0255592 A1 * | 11/2006 | Minemyer | F16L 21/06 | 285/373 |
| 2013/0140410 A1 * | 6/2013 | Lee | H02G 3/30 | 248/74.2 |
| 2016/0124172 A1 * | 5/2016 | Miller | G02B 6/4459 | 385/136 |
| 2017/0269319 A1 * | 9/2017 | Miller | G02B 6/4477 | |

* cited by examiner

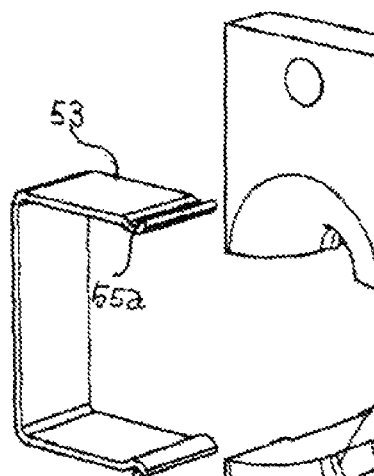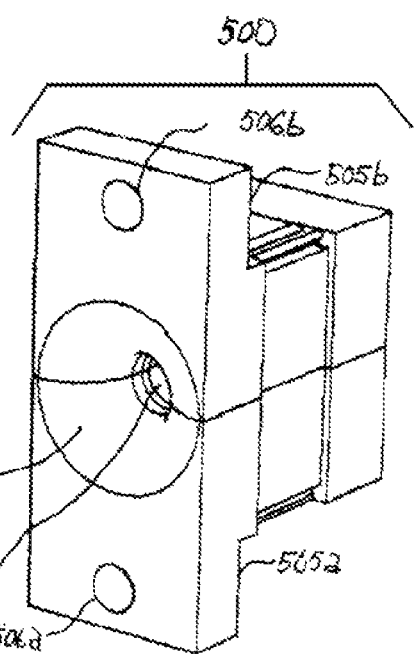
FIG. 5A      FIG. 5B

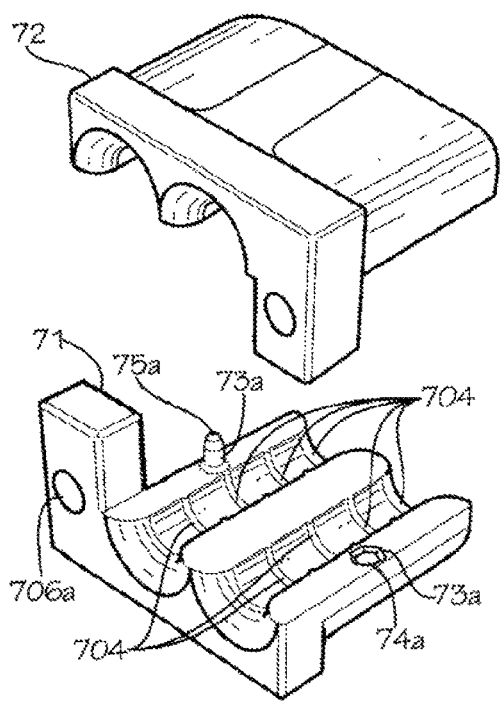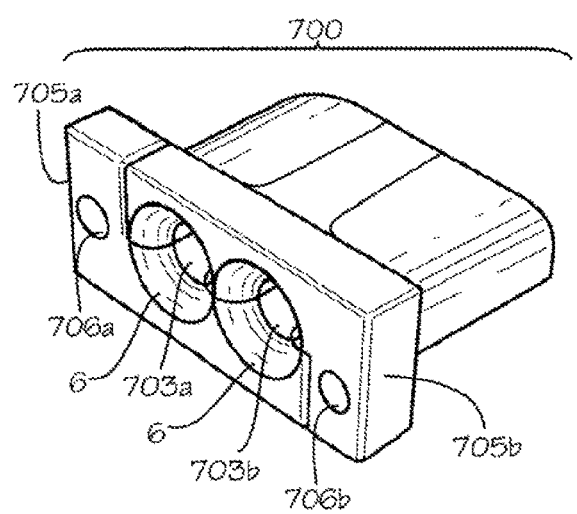
FIG. 7A
FIG. 7B

PANEL-MOUNTABLE FIBER OPTIC CABLE FEEDTHROUGH

CROSS REFERENCES TO RELATED APPLICATIONS

This application claims the benefit of U.S. Non-Provisional patent application Ser. No. 14/929,703 filed Nov. 2, 2015, titled PANEL-MOUNTABLE FIBER OPTIC CABLE FEEDTHROUGH, the contents of which are hereby incorporated by reference herein.

TECHNICAL FIELD AND INDUSTRIAL APPLICABILITY OF THE INVENTION

This invention relates to a novel panel-mountable fiber optic cable feedthrough that has two main body parts that can be brought together around a single or multiple fiber optic cables and secured in place to prevent slippage of the cable(s).

BACKGROUND OF THE INVENTION

Terrestrial communications throughout the world has grown to rely heavily on optical fiber communications technology. And there is an increasing flow of signaling information that requires use of multiple optical fibers in communication links from one point to another. The various origination, termination, and relay points for optical fiber distribution systems form huge matrices—much more complicated than, say, a map of the railroads or the electrical power grid infrastructures in the United States and abroad. In fact, some optical fiber links do run along power lines and railroad right-of-ways. But, they also run under seas, across farmers' fields, down city streets, into campuses and within buildings and homes.

Management of complex fiber optic communication systems requires many different types of specialized optical and electronic equipment to ensure that correct signals are continuously being sent and received with minimum interruptions and that any failures are detected and quickly rectified.

At a very basic level, it is necessary to use an optical tap to extract a portion of the optical signal in each fiber within a transmission cable so that its functionality can be monitored. In some cases, monitoring the total optical power level is sufficient [see U.S. patent application Ser. No. 14/203,566 dated Mar. 11, 2014 by G. Miller et al titled MULTI-PURPOSE APPARATUS FOR SWITCHING, AMPLIFYING, REPLICATING, AND MONITORING OPTICAL SIGNALS ON A MULTIPLICITY OF OPTICAL FIBERS]. In other cases where multiple optical channels are simultaneously transmitted on a single fiber using wavelength division multiplexing (WDM), it is often necessary to use arrayed waveguide gratings (AWGs) to separate the individual optical channels before they are directed to monitoring equipment [see U.S. patent application Ser. No. 14/205,368 dated Mar. 12, 2014 by G. Miller et al titled APPARATUS FOR SELECTIVE FIBER OPTICAL CHANNEL MONITORING AND CHANNEL REPLICATION OF WAVELENGTH DIVISION MULTIPLEXED (WDM) SIGNALS]. In other cases, optical splitters and optical switches are also employed for monitoring purposes. Due to the large number of optical fibers used in modern optical communication systems, many optical taps, AWGs, splitters and switches are employed. A multiplicity of these components is typically located inside of an equipment enclosure and these enclosures are mounted in racks that fill equipment bays often with a multiplicity of interconnecting fiber optic patch-cord cables [see U.S. patent application Ser. No. 14/072,528 dated Nov. 5, 2013 by G. Miller et al titled HIGH DENSITY ENCLOSURE FOR OPTICAL MODULES].

Clearly, it is desirable to reduce both the time and expense associated with interconnecting the various pieces of communication equipment within equipment bays and to minimize the optical attenuation associated with these interconnections. And this has been an ongoing evolutionary process for all types of equipment, enclosures and patch-cord cables used in modern fiber optical communication systems.

The state-of-the-art for interconnecting various optical components like optical taps is to pack some manageable number of them into a modular container (also referred to as a cassette) that has optical connectors on one or more of its narrow sides. These modular containers are, in turn, closely packed side-by-side into an equipment enclosure that is mounted in an equipment rack such that most or all of the optical connectors on the modular containers face outward for convenient access.

However, for various reasons, including the desirability of increasing the packing density of the cassettes within an equipment enclosure, the cassettes are sometimes located internal to an equipment enclosure well away from the front panel. [see U.S. patent application Ser. No. 14/072,528 referenced above] In such cases, the connection between an equipment cassette and the front panel of the equipment enclosure is typically made with an optical fiber or multi-fiber optic ribbon cable internal to the equipment enclosure that terminates with an optical connector mounted on the outer surface of the enclosure. Then optical patch-cord cables, also terminated with optical connectors, are used to interconnect equipment enclosures.

While use of optical patch-cord cables in this manner is a broadly used installation practice within equipment bays, it is apparent that in some cases it might be desirable to eliminate one or more optical connectors mounted on the surface of equipment enclosures and simply feed the optical patch-cord cable directly through a hole in the enclosure's surface (panel) so that it may continue to an internal equipment cassette where it can be connected (terminated). This strategy would have several advantages: (1) it would eliminate both the cost and optical attenuation associated with an optical connection located on the surface of the equipment enclosure, (2) the patch-cord could possibly be terminated with an optical connector outside of the equipment enclosure, where access is not limited, and simply passed through a conveniently located hole in the outer surface of the equipment enclosure, (3) this strategy might be used at both ends of the fiber optic patch-cord cable for even greater savings of cost and installation time. However, at present there are no fiber optic cable feedthroughs that are inexpensive, easy to install, and capable of securing a pre-terminated (with optical connector) fiber optic cable patch-cords in place.

BRIEF SUMMARY OF THE INVENTION

The purpose of this disclosure is to describe a novel panel-mountable fiber optic cable feedthrough that has all of the above mentioned characteristics: easy to install, capable of securing a pre-terminated fiber optic patch cord firmly in place and is inexpensive to produce. While the specific design of the panel-mountable fiber optic feedthrough discussed here is based on the dimensions of the popular SC fiber connector design first introduced by NTT (Nippon Telephone and Telegraph) in Japan that has now become an industry standard, the choice is one of convenience to provide a specific example rather than a necessity to limit the feedthrough design to only the SC fiber connector foot-print on a panel associated with an equipment enclosure. In fact, there is a quite a variety of fiber optic connectors including the LC, FC, MT and MTP, as discussed in "Fiber Optic Product Families" published by Molex and available on the Internet (www.molex.com/fiber) and many of them could also provide a suitable foot-print for a fiber optic feedthrough. In any case, it would be preferable, if practical, to select a feedthrough foot-print that manufacturers and users are familiar with and have existing tooling to make the necessary holes in metal or plastic panels. The choice of the SC foot-print satisfies this criteria but it is not essential to the design of the feedthrough.

The essential design features for any panel mounted fiber optic patch-cord feedthrough include (1) one or more cylindrical cavities within the body of the feedthrough through which the patch-cord cable(s) can pass, (2) means for gripping and securing the patch-cord cable(s) in place relative to the feedthrough body, and (3) means for securing the feedthrough to the equipment panel. Additional desirable design features include (4) means for limiting the strain in the optical cable(s) where it exits the feedthrough (strain relief), and (5) elimination of the stress need to thread or pull an optical cable through a cylindrical cavity.

The first three essential design features could be satisfied in a rather straightforward manner using a cylindrically symmetric feedthrough structure with a threaded outside diameter that is partially inserted in a circular hole in an equipment panel and that is secured in place with one or two screw-threaded retaining nuts (with two nuts, one on each side of the panel). But, there are some undesired complications using such a structure because it may not include the desirable feature (4) and will not include the desirable feature (5), mentioned above.

One complication with such a simple feedthrough design described above is that the fiber optic cable must be carefully threaded or pulled through a rather tight fitting cylindrical cavity in the feedthrough body and subsequently secured in place, possibly using a bonding agent or, perhaps, a compression ring that grips the fiber cable when the retaining nut(s) is tightened. Use of a bonding agent makes disassembly of such a feedthrough difficult while use of a compression ring becomes a substantial design and production complication which increases expense. Further, the required tight fit of the cable through the cylindrical cavity in the feedthrough would make it impractical to pass a pre-terminated fiber optic patch-cord cable due to the larger size of the optical connector relative to the cable diameter. In addition, incorporation of some form of strain relief would be substantially more complex for a circularly symmetric designed feedthrough because its outside diameter would have to be further enlarged to accommodate a strain relief mechanism. This in-turn would require a larger size retaining nut that would take up more valuable surface area on the panel that could be better used to support additional optical connectors and feedthroughs. Increasing connector and feedthrough packing density on equipment panels is already recognized as a desirable design objective.

The complications noted above have been eliminated with several novel designs employing feedthroughs that all split open into two mating parts that can be closed around a single or multiple optical cable(s) at any desired location without the need for threading or pulling the cable(s) through one or more tight fit cylindrical cavities in the feedthrough's body. Each of the two main body parts that make up the feedthrough in such an axial-split design includes half of one or more cylindrical cavities. Simple provisions have been included to allow the two split body parts to first be loosely fit to surround the optical cable(s) and subsequently secured tightly together around the cable with minimum effort.

Strain relief for the fiber optic cable can also be incorporated into this feedthrough design in a simple manner and without increasing the feedthrough's outside dimensions or adding additional parts. In addition, a series of ribs can be formed on the inside diameter(s) of the cylindrical cavities during injection molding to ensure a very tight grip on the fiber optic patch-cord cable(s) when the two main body parts are secured together.

The novel design features of this type of panel-mountable fiber optic feedthrough will become more evident in the following discussion by referring to the accompanying drawings.

BRIEF DESCRIPTION OF THE DRAWINGS

FIG. 2A shows this feedthrough in an open position.

FIG. 4A shows the feedthrough body parts in an open position.

FIG. 5A is a clip adapter version of a fiber optic cable feedthrough that is also made with two principal body parts that can be joined together by a "U" shaped spring clip. FIG. 5A shows the feedthrough parts in an open (exploded) position.

FIG. 5B shows the same parts as in FIG. 5A fully assembled in a closed position.

FIG. 6A shows the feedthrough parts in an open (exploded) position.

FIG. 7A is a peg adapter version of a dual fiber optic cable feedthrough that is also made with two principal body parts that can be joined together by two cylindrical shaped pegs. FIG. 7A shows the feedthrough parts in an open (exploded) position, and FIG. 7B shows the same parts as in FIG. 7A fully assembled in a closed position.

DETAILED DESCRIPTION OF PREFERRED EMBODIMENTS

Figure 1C:
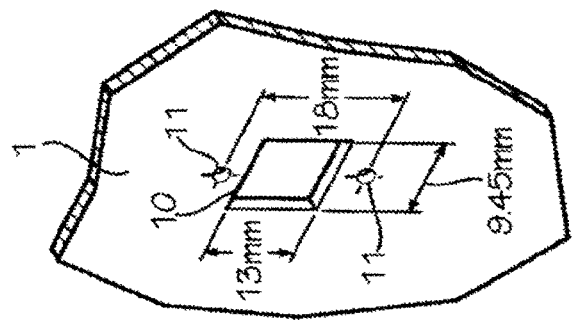
FIG. 1C shows the shape and dimensions of a rectangular hole and two smaller circular holes in a panel that would be required to secure a fiber optic feedthrough in place, such as the one shown in FIG. 1A, that is designed to match the standard dimensions of an SC fiber optic connector mount.
Figure 1B:
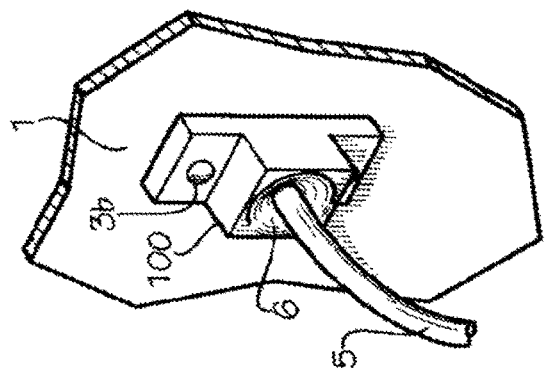
FIG. 1B is an isometric view of the same panel-mounted fiber optic cable feedthrough shown in FIG. 1A.
Figure 1A:
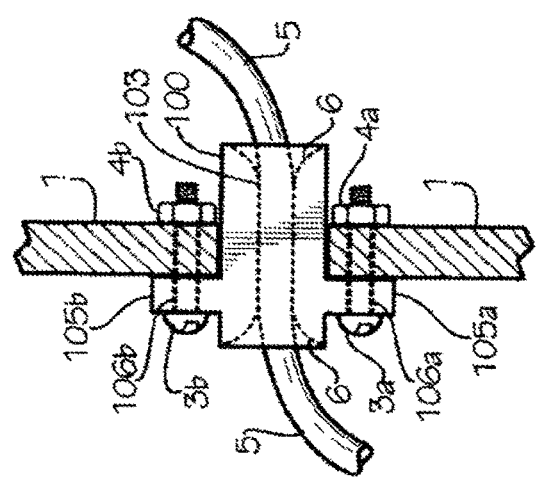
FIG. 1A shows a cross sectional view of a panel-mounted fiber optic cable feedthrough secured in a panel with a pair or screws and matching nuts and having a fiber optic cable passing through it.

With reference to the attached drawings, embodiments of the present invention will be described in the following:

FIG. 1A shows a cross-sectional view of the basic construction and installation details of a typical panel-mounted fiber optic cable feedthrough 100. This feedthrough 100 has a lower flange 105a and an upper flange 105b each with a circular hole 106a and 106b, respectively, to accommodate two identical machine screws 3a and 3b. When the feedthrough 100 is installed in the panel 1, the machine screws 3a and 3b pass through holes 106a and 106b in the flanges 105a and 105b and then through the two holes 11 in the panel 1. The screws 3a and 3b are then secured in place by tightening matching nuts 4a and 4b or simply by rotating the screws 3a and 3b into pre-threaded holes in panel 1. This action fastens the feedthrough 100 to the panel 1. To be compatible with the standard SC mounting parts, the screws 3a and 3b should have a diameter of 2 mm and the holes 106a, 106b and 11 (if nuts are used) through which these screws pass should have a nominal diameter of 2.4 mm to provide adequate clearance for these screws. The fiber optic cable 5 passes entirely through a cylindrical cavity 103 in the feedthrough 100 that has a trumpet-bell shaped flare 6 on one or both ends of the feedthrough 100. Such a feedthrough can be made with various sized cylindrical cavities 103 to accommodate fiber optic cables 5 of varying diameters, including the industry standard diameters of 3.0 mm, 2.0 mm, and 1.6 mm. The fit of the fiber optic cable outside diameter to the diameter of the cylindrical cavity in the feedthrough should be snug with a minimum or zero clearance gap between the two diameters. This is to ensure a firm grip on the cable and to minimize any pathway for leakage of liquids that might be spilled on the equipment enclosure.

FIG. 1B is an isometric view of the same feedthrough 100 as shown in FIG. 1A as it would be seen on the outside of a panel 1.

FIG. 1C shows the dimensions of a rectangular hole 10 and two smaller circular holes 11 that must be made in the panel 1, to accommodate the installation of a feedthrough 100 as shown in FIG. 1A and FIG. 1B that would be compatible with a standard SC fiber optic connector mounting design details. The two holes 11 should both have a nominal diameter of 2.4 mm to provide adequate clearance for the 2.0 mm diameter attachments screws 3a and 3b shown in FIG. 1A.

Figures 2A, 2B:
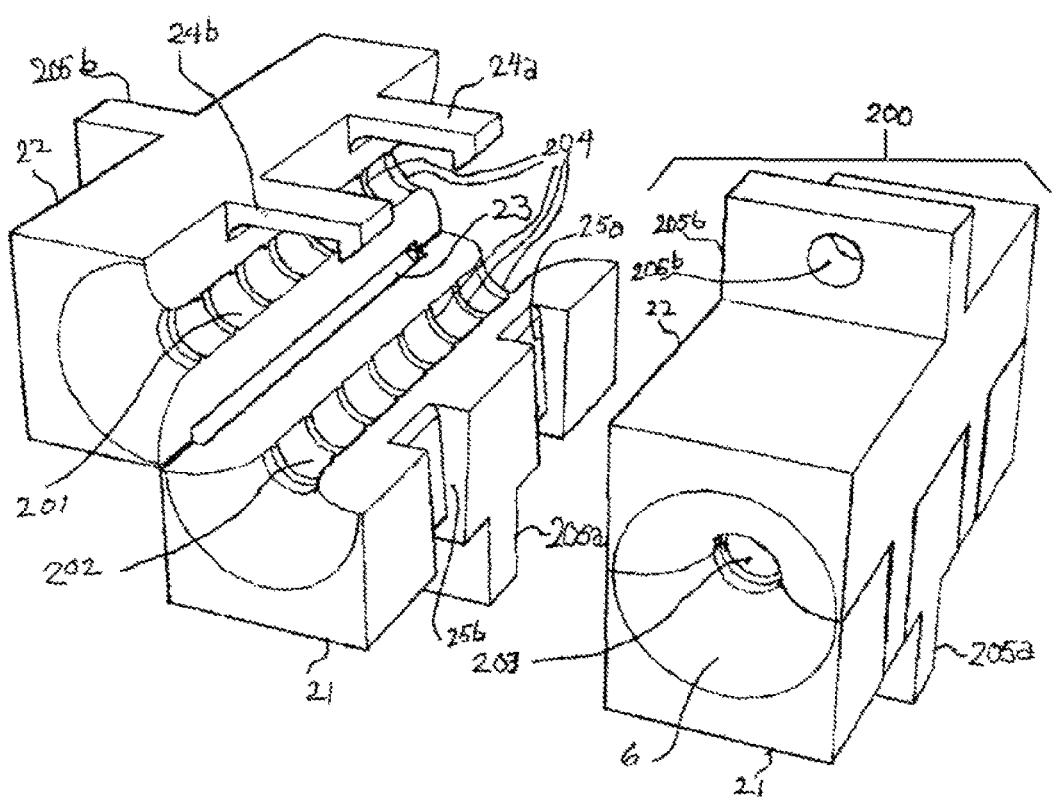
FIG. 2A is a hinged version of a fiber optic cable feedthrough that is made of two main body parts that are joined together with a hinge.
FIG. 2B shows the same hinged feedthrough parts as in FIG. 2A in a fully closed position.

FIG. 2A shows an example of a hinged version of a fiber optic cable feedthrough 200 that is made of two principal parts 21 and 22 that are interconnected with a hinge 23. FIG. 2A shows the feedthrough in an open position while FIG. 2B shows the same parts fully closed. The entire feedthrough assembly 200 including parts 21 and 22 as well as the hinge 23 can all be injection molded from a plastic material, such as high density polyethylene (HDPE), nylon, poly-acrylate, polyurethane or other similar material, in a single step. Part 22 includes two latching arms 24a and 24b and a semi-circular cavity 201 while part 21 includes two channels 25a and 25b into which the latching arms 24a and 24b fit as well as a similar semicircular cavity 202. When these two main body parts are rotated about the hinge 23 to a closed position, the latching arms 24a and 24b fit into the channels 25a and 25b causing parts 21 and 22 to snap shut, as shown in FIG. 2B. There are also a series of ribs 204, typically with a semi-circular cross section or some other shape with a similar physical extent in the axial directions of the semi-circular channels 201 and 202 located on the inner surfaces of these channels. Each of these ribs 204 is typically in the range of 0.1 to 0.2 mm high for various standard fiber optic cable sizes ranging from 1.6 to 3.0 mm in diameter. Specifically, the nominally rib heights are 0.1 mm for a 1.6 mm diameter fiber optic cable, 0.15 mm for a 2.0 mm diameter fiber optic cable and 0.2 mm for a 3.0 mm diameter fiber optic cable. These heights are only approximate and may vary somewhat when optimizing a feedthrough design for a specific fiber optical cable depending on the particular jacketing material used in the cable. The ribs 204 have a typical spacing of 3 mm and there are typically three or more such ribs 204 per feedthrough. Their function is to contact and then locally compress the outer plastic jacket on the fiber optic cable when the feedthrough is closed upon a fiber optic cable 5. These ribs 204 in effect "bite down" on the fiber optic cable 5 to help ensure a very firm grip of the feedthrough on this fiber optic cable. The feedthrough 200 also has a flange 205a and another flange 205b in main body parts 21 and 22, respectively, with similar holes 206a (not shown) and 206b penetrating through these flanges for the purpose of attaching the feedthrough 200 to an equipment panel 1 with screws and optional nuts as shown in FIG. 1A but not in FIG. 2A.

FIG. 2B shows the same fiber optic feedthrough as in FIG. 2A when closed. In this configuration, parts 21 and 22 form a circular cavity 203 shown both in FIG. 2B and FIG. 1A that may have a trumpet-bell shaped flare 6 at one or both of its ends. The purpose of this flare 6 is to provide a physical lower limit on the bending radius of curvature that the fiber optic cable 5 (not shown) may assume as it passes out of the cylindrical cavity 203. Limiting this radius of curvature in this fashion to be equal to or greater than 3 mm is one way to limit the strain in the glass optical fiber(s) contained within the fiber optic cable 5 (shown in FIG. 1A but not FIG. 2A). Such a limitation is prudent to avoid breakage of the glass fiber(s).

Figures 3A, 3B:
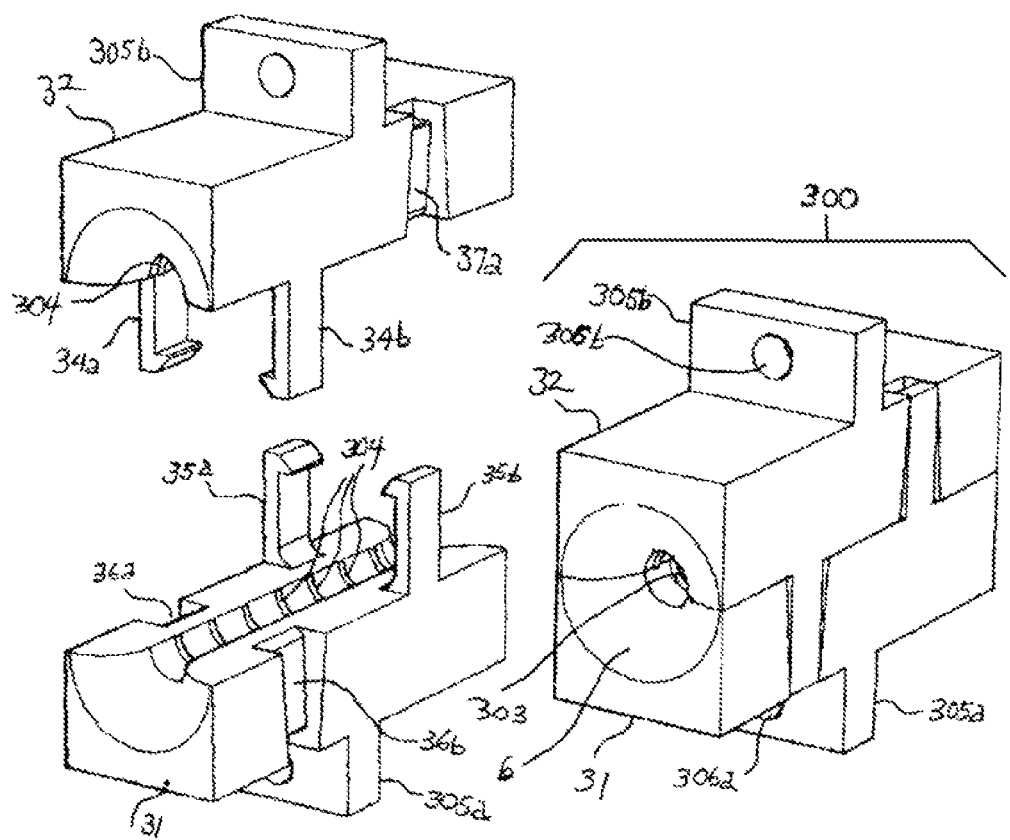
FIG. 3A shows a snap-together version of a fiber optic cable feedthrough that is separated into two parts.
FIG. 3B shows the same snap-together feedthrough parts as in FIG. 3A that are snapped together in a fully closed position.

FIG. 3A shows a snap-together version of a fiber optic cable feedthrough 300 that is separated into two unconnected parts 31 and 32 shown in FIG. 3A that are designed to be snapped together as shown in FIG. 3B. When closed, as in FIG. 3B, the feedthrough 300 is held firmly together by latching arms 34a and 34b in part 32 and latching arms 35a and 35b in part 31. These four latching arms fit into four channels, two channels 36a and 36b in part 31 and two more channels 37a and 37b (not shown) in part 32. This feedthrough design can also accommodate ribs 304, similar to those shown as 204 in FIG. 2A to secure the fiber optic cable in place within the cylindrical cavity 303.

FIG. 3B shows the fiber optic feedthrough parts in FIG. 3A in a fully closed position. The purpose or the optional trumpet-bell shaped flared end(s) 6 of the cylindrical cavity 303 is, as discussed in FIG. 2B, above, for strain relief of the fiber optic cable. The feedthrough 300 also includes a flange 305a and another flange 305b in main body parts 21 and 22, respectively, with similar holes 306a (not shown) and 306b penetrating through these flanges for the purpose of attaching the feedthrough 300 to an equipment panel 1 with screws and optional nuts as shown in FIG. 1A but not in FIG. 3B.

Figures 4A, 4B:
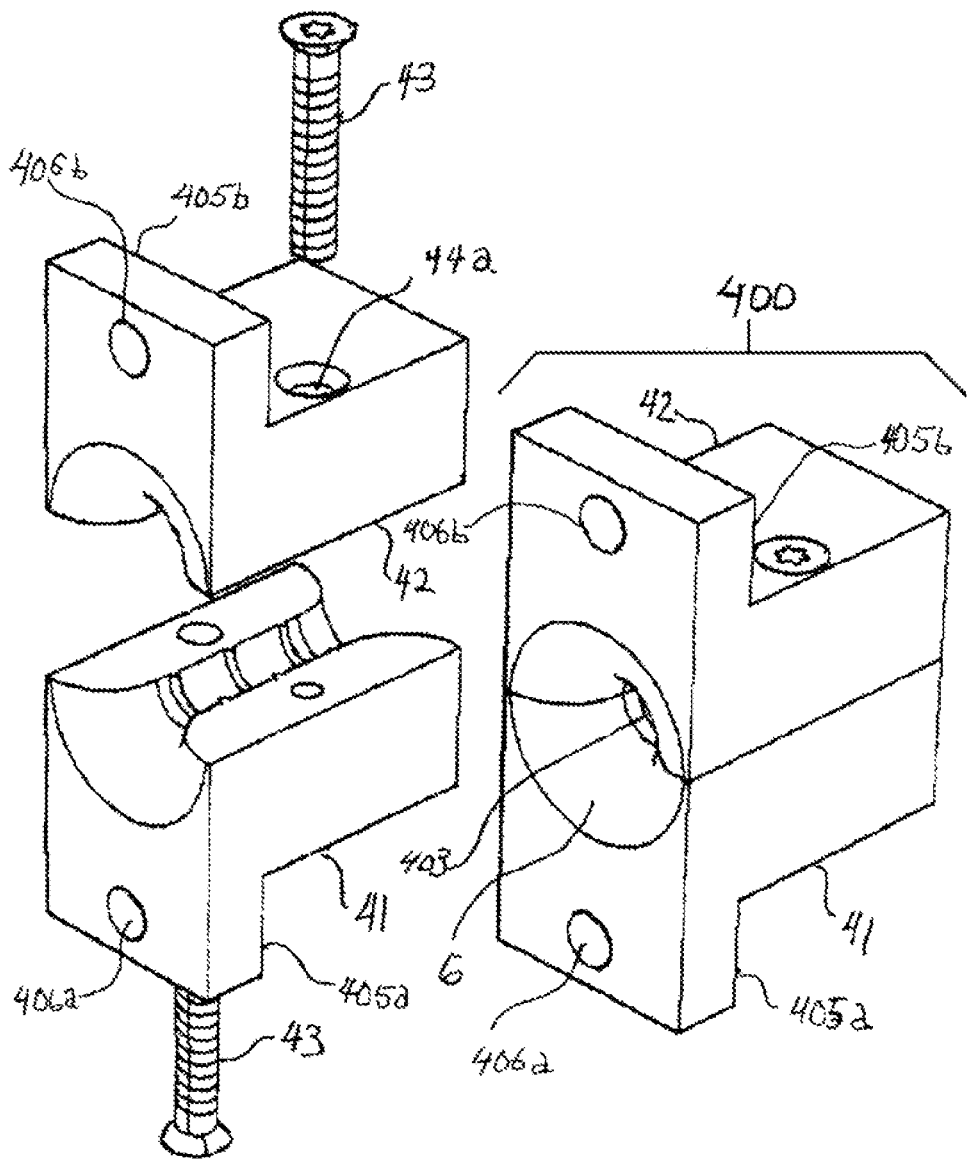
FIG. 4A is a screw adapter version of a fiber optic cable feedthrough that is also made with two principal body parts that can be joined together by two screws.
FIG. 4B shows the same screw adapter version of the feedthrough body parts as in FIG. 4A in a fully closed position.

FIG. 4A is a screw adapter version of a fiber optic cable feedthrough 400 that is also made with two principal body parts 41 and 42 that can be joined together by two identical screws 43. FIG. 4A shows the feedthrough parts in an open (separated) position while FIG. 4B shows the same parts fully closed and secured by the two screws. It should be noted that in this design, the position of the holes 44a and 44b (not shown) to pass and secure the screws in parts 41 and 42 are off-set from the cylindrical cavity 403 so as not to interfere with the fiber optic cable that will be located within this cavity. Ribs 404 and the optional trumpet-bell shaped flared end(s) 6 of the cylindrical cavity 403 may also be included in this design and serve the same functions as discussed in the descriptions of FIG. 2A and FIG. 3A. The feedthrough 400 also has a flange 405a and flange 405b in main body parts 21 and 22, respectively, with similar holes 406a and 406b penetrating through these flanges for the purpose of attaching the feedthrough 400 to an equipment panel 1 as shown in FIG. 1A but not in FIG. 4B.

FIG. 4B shows the same fiber optic feedthrough parts as in FIG. 4A assembled in a fully closed position.

FIG. 5A shows a clip adapter version of a fiber optic cable feedthrough 500 that is also made with two principal parts 51 and 52, similar to the one shown in FIG. 4, but that can be joined together by a "U" shaped spring clip 53 rather than screws. FIG. 5A shows the feedthrough parts in an open position (exploded view) while FIG. 5B shows the same parts fully assembled in a closed position. Both ends of the spring clip 53 have detents 55a and 55b that secure in channel 56a in part 52 and channel 56b (no shown) in part 51 when the split parts of this feedthrough are closed and secured. Ribs 504 and the optional trumpet-bell shaped flared end(s) 6 of the cylindrical cavity 503 may also be included in this design and serve the same functions as discussed in the descriptions of FIG. 2B and FIG. 3B. The feedthrough 500 also has a flange 505a and flange 505b in main body parts 51 and 52, respectively, with similar holes 506a and 206b penetrating through these flanges for the purpose of attaching the feedthrough 500 to an equipment panel 1 as shown in FIG. 1A but not in FIG. 5A.

FIG. 5B shows the same fiber optic feedthrough parts as in FIG. 5A assembled in a fully closed position.

Figure 6A:
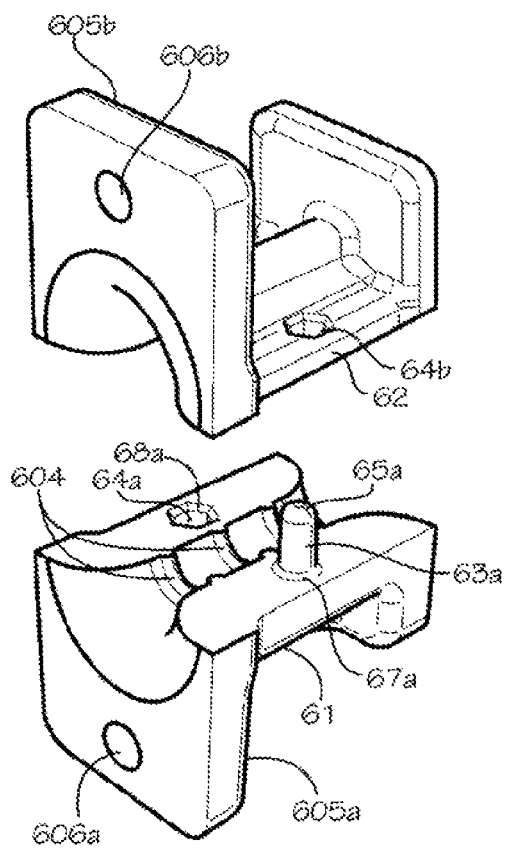
FIG. 6A is a peg adapter version of a fiber optic cable feedthrough that is also made with two principal body parts that can be joined together by two cylindrical pegs.

FIG. 6A shows a peg adapter version of a fiber optic cable feedthrough 600 that is also made with two identical parts 61 and 62, similar to the ones shown in FIG. 4A, but that can be joined together by a press fit of two integral cylindrical pegs 63a and 63b into two hexagonal shaped holes 64a and 64b. FIG. 6A shows the feedthrough parts in an open position (exploded view). Both identical pegs 63a and 63b (only 63a is shown in FIG. 6A) have rounded tops 65a and 65b to assist in their initial manual insertion into identical hexagonal shaped holes 64a and 64b. The base 66a or 66b of each peg has a male cylindrical bevel 67a or 67b that serves to center the peg into a corresponding female cylindrical bevel 68a or 68b located at the entrance of each hexagonal hole.

The purpose for the use of a cylindrical peg and a hexagonal hole is to limit the common contact surface area between the outer surface of the peg and the inner surface of the hole so that assembly and disassembly of the feedthrough parts 61 and 62 typically requires less force as compared with the use a cylindrical peg and a mating cylindrical hole. Although a hexagonal shaped hole as shown in FIG. 6A is preferred, other polygon shaped holes with rotational symmetry (including a circle in the limit of a polygon with an infinite number of sides) would also be satisfactory for use in this type of fiber optic feedthrough design.

Ribs 604 and the optional trumpet-bell shaped flared end(s) 6 of the cylindrical cavity 603 may also be included in this design and serve the same functions as discussed in the descriptions of FIG. 2A and FIG. 3A. The feedthrough 600 also has a flange 605a and flange 605b in main body parts 61 and 62, respectively, with similar holes 606a and 606b penetrating through these flanges for the purpose of attaching the feedthrough 600 to an equipment panel 1 as shown in FIG. 1A but not in FIG. 6A.

Figure 6B:
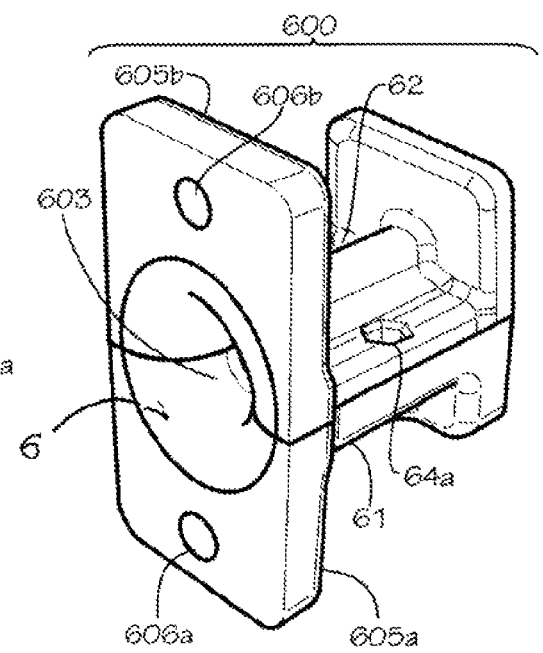
FIG. 6B shows the same parts as in FIG. 6A fully assembled in a closed position.

FIG. 6B shows the same parts as shown in FIG. 6A fully assembled in a closed position.

FIG. 7A shows a peg adapter version of a dual fiber optic cable feedthrough 700 that is made with two identical parts 71 and 22, similar to the ones shown in FIG. 6A, but with two cylindrical cavities 703a and 703b that can be joined together by a press fit of two integral tapered cylindrical pegs 73a and 73b into two hexagonal shaped holes 74a and 74b. FIG. 7A shows the feedthrough parts in an open position (exploded view). Both identical pegs 73a and 73b (only 73a is shown in FIG. 7A) have rounded tops 75a or 75b to assist in their initial manual insertion into identical hexagonal shaped holes 74a and 74b. The base of each peg 73a or 73b has a male cylindrical bevel 77a or 77b that serves to center the peg into a corresponding female cylindrical bevel 78a or 78b at the entrance of each hexagonal hole 74a or 74b.

The purpose for the use of a cylindrical peg and a hexagonal hole is to limit the common contact surface area between the outer surface of the peg and the inner surface of the hole so that assembly and disassembly of the feedthrough parts 71 and 72 typically requires less force as compared with the use a cylindrical peg 73a or 73b and companion cylindrical hole 74a or 74b that have a constant cross-sectional areas throughout their depth. Although a hexagonal shaped hole is shown in FIG. 7A is preferred, other polygon shaped holes with rotational symmetry would also be satisfactory for use in this type of fiber optic feedthrough design (including a circle in the limit of a polygon with an infinite number of sides).

FIG. 7B shows the same parts as shown in FIG. 7A fully assembled in a closed position.

The design of dual cavity fiber optic cable feedthrough shown in FIG. 7A and FIG. 7B is an example of a multi-fiber optic cable feedthrough having three or more parallel cavities.

Ribs 704 and the optional trumpet-bell shaped flared end(s) 6 of the cylindrical cavities 703a and 703b may also be included in this design and serve the same functions as discussed in the descriptions of FIG. 2A and FIG. 3A. The feedthrough 700 also has a flange 705a and flange 705b in main body parts 71 and 72, respectively, with similar holes 706a and 706b penetrating through these flanges for the purpose of attaching the feedthrough 700 to an equipment panel 1 as shown in FIG. 1A but not in FIG. 7A.

While the above drawings provide representative examples of specific embodiments of the inventive panel-mounted fiber optic feedthroughs all with axial-split body designs, there are numerous variations in the shape and design details of these feedthroughs and the diameters of optical fiber cables (containing a varying number of optical fibers) that can be secured within them.

I claim:

1. A panel-mountable fiber optic cable feedthrough that is comprised of two main body parts made from a plastic material and each including an open semicircular channel and a flange such that (1) when these parts are assembled around a fiber optic cable and joined together by a mechanical securing means the two semicircular channels in the said main body parts form a full circular cavity around a fiber optic cable with a tight fit having a minimum or zero clearance gap between the outside diameter of the fiber optic cable and the inside diameter of circular cavity in the feedthrough, (2) there are multiple ribs on the inner surface of the circular cavity from 0.1 to 2.0 mm in height that bite down on the outer surface of the fiber optic cable to hold it securely in place when the feedthrough is assembled around the said fiber optic cable, (3) each flange includes at least one penetrating hole so that the feedthrough can be positioned with the holes in the two flanges co-axial and adjacent to similar penetrating holes in an equipment panel and secured to the panel by fasteners, including screws that fit into threaded holes in the equipment panel or with matching nuts if the screws pass entirely through the equipment panel, and (4) one or both ends of the circular cavity have a trumpet bell-shaped flare with a minimum radius of curvature of 3 mm to provide strain relief for the optical fibers(s) in the fiber optic cable.

2. A panel-mountable fiber optic feedthrough as in claim 1 having the two main body parts made of plastic materials comprised of nylon, poly-acrylate, high density polyethylene (HDPE), or polyurethane.

3. A panel-mountable fiber optic feedthrough as in claim 1 having its two main body parts secured together by a press fit of two integral pegs, one in each main body part, into two mating hexagonal holes, one in each main body part.

4. A panel-mountable fiber optic feedthrough as in claim 1 having its two main body parts secured together by a press fit of two integral pegs, one in each main body part, into two mating polygon holes, one in each main body part.

* * * * *